J. T. Boswell,
Fertilizer Sower.
No. 96,388.    Patented Nov. 2, 1869.
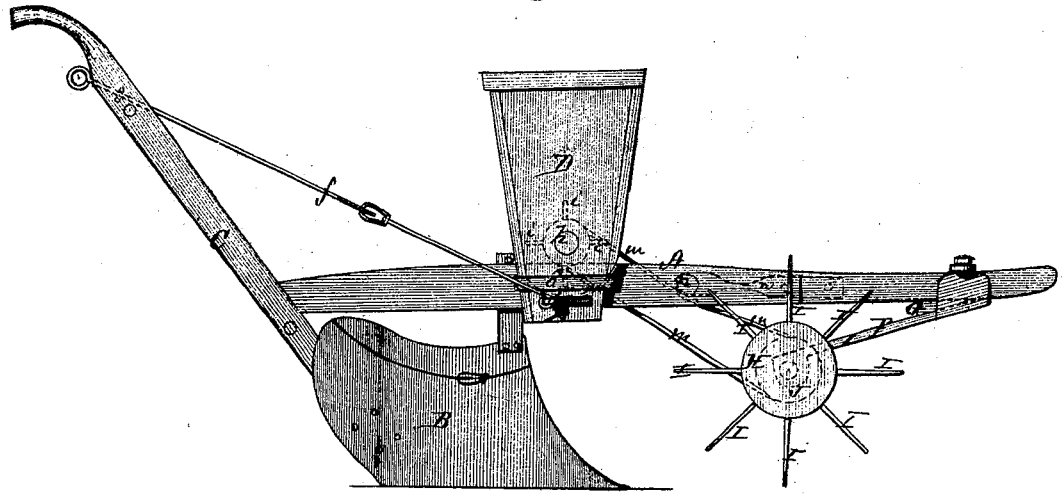
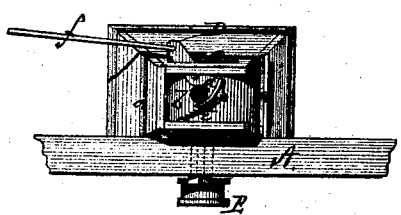
Witnesses.
Harry King
C. L. Evert
Inventor:
John T. Boswell
per
Alexander T. Mason
Attys.

United States Patent Office.

JOHN I. BOSWELL, OF CHRISTIANSVILLE, VIRGINIA.

Letters Patent No. 96,388, dated November 2, 1869.

IMPROVEMENT IN FERTILIZER-ATTACHMENT FOR PLOWS.

The Schedule referred to in these Letters Patent and making part of the same.

*To all whom it may concern:*

Be it known that I, JOHN I. BOSWELL, M. D., of Christiansville, in the county of Mecklenburg, and in the State of Virginia, have invented certain new and useful Improvements in Fertilizer-Attachment for Plows; and do hereby declare that the following is a full, clear, and exact description thereof, reference being had to the accompanying drawings, and to the letters of reference marked thereon, making a part of this specification.

The nature of my invention consists in the construction and arrangement of a "fertilizer-attachment for plows," which can be transferred, with very little trouble, from one plow to another.

In order to enable others skilled in the art to which my invention appertains to make and use the same, I will now proceed to describe its construction and operation, referring to the annexed drawings, in which—

Figure 1 is a side view of a plow, with my attachment; and

Figure 2 is a bottom view of the hopper, containing the fertilizer.

A represents the plow-beam; B, the plow; and C, the handles of any plow, made in any of the known and usual ways.

To the side of the beam A is secured a hopper, D, directly in front of the plow.

This hopper may be secured to the beam in any suitable manner, so as to be easily removed, but I prefer attaching it in the following manner, namely:

A square iron frame, a, is secured to the beam A, by means of a shank that goes through the beam, and fastened by nuts on the opposite side. The hopper D sits in this iron frame.

The bottom b of the hopper D is concave, with an opening, through which the fertilizer is discharged, and is removable, so that others, with larger or smaller opening, may be substituted.

Under the bottom b is pivoted a stop-plate, d, which is held, by means of a spring, e, in such a manner as to cover the opening in the bottom, and prevent the fertilizer from passing through.

A wire, f, runs from the outer end of the stop-plate d, up to the handle C, and has a loop formed at its upper end, within easy reach of the operator's index-finger, so that he can at suitable intervals, by a slight pull on said wire, open the bottom of the hopper, and allow the fertilizer to pass through. As soon as the operator lets go the wire f, the spring e puts the stop-plate back in position, closing the opening in the bottom.

Inside of the hopper D, just above the bottom b, is placed a shaft, h, having arms i i, which, when the shaft is revolved, as will be hereinafter set forth, stir the fertilizer, prevent it from clogging, and facilitate its egress through the opening in the bottom.

On the under side of the beam A, a suitable distance in front of the hopper and plow, is secured a spring-bar, F, which extends downward and toward the rear, as seen in fig. 1.

Between the front end of the spring-bar F and the beam A, is placed a wedge, G, through which the bolt, that secures the spring-bar, passes, and this wedge may be exchanged for one larger or smaller, so as to cause the said spring-bar to incline at any angle desired.

Through the rear end of the spring-bar F passes a shaft, having, at its outer end, a circular disk, H, with arms I I radiating from the centre, and at its other end a pulley, J, which, by means of a belt, m, is connected with a pulley, E, on the end of the shaft h, outside of the hopper D.

The wheel H I may, if desired, be provided with a circumferential rim.

When the plow is in motion, the wheel H I, resting on the ground, revolves, and through the belt m communicates motion to the stirrer h i, inside of the hopper.

On that side of the beam A, where the belt m passes, is pivoted an arm, n, provided at its rear end with a friction-roller, o, which bears against the belt m, and by this means, the belt can at all times be kept taut enough to revolve the stirrer.

This attachment can be readily transferred from one plow to another.

Having thus fully described my invention,

What I claim as new, and desire to secure by Letters Patent, is—

1. The hopper D, constructed as described, with removable bottom b, stop-plate d, spring e, and wire f, all substantially as and for the purposes herein set forth.

2. Securing the hopper D to the plow-beam A, by means of the iron frame a, substantially as herein set forth.

3. The spring-bar F, provided with wheel H I, and pulley J, and connected to the plow-beam A, substantially in the manner and for the purposes herein set forth.

4. The stirrer h i, belt m, pulleys E J, arm n, and roller o, all constructed and arranged substantially in the manner and for the purposes herein set forth.

5. In combination with a plow, a fertilizer-attachment, constructed substantially as herein shown and described.

In testimony that I claim the foregoing, I have hereunto set my hand, this 17th day of August, 1869.

JOHN I. BOSWELL, M. D.

Witnesses:
C. L. EVERT,
A. N. MARR.